(12) United States Patent
Sperle et al.

(10) Patent No.: US 7,120,265 B2
(45) Date of Patent: Oct. 10, 2006

(54) CASING FOR AN ELECTRONIC DEVICE AND PROCESS FOR ASSEMBLY OF SUCH A CASING

(75) Inventors: Cornelius Sperle, Angers (FR); Michel Evenisse, Fontaine-Milon (FR); Patrice Fremanteau, Villeveque (FR)

(73) Assignee: Thomson Licensing, Boulogne-Billancourt (FR)

( * ) Notice: Subject to any disclaimer, the term of this patent is extended or adjusted under 35 U.S.C. 154(b) by 199 days.

(21) Appl. No.: 10/277,448

(22) Filed: Oct. 22, 2002

(65) Prior Publication Data
US 2003/0076971 A1 Apr. 24, 2003

(30) Foreign Application Priority Data
Oct. 23, 2001 (EP) .................................. 01125111

(51) Int. Cl.
*H04R 25/00* (2006.01)
(52) U.S. Cl. ....................... 381/306; 381/333; 381/388
(58) Field of Classification Search ........ 381/305–307, 381/333–336, 345, 353, 354, 388; 361/676–682
See application file for complete search history.

(56) References Cited

U.S. PATENT DOCUMENTS

| | | | |
|---|---|---|---|
| 5,139,319 A | 8/1992 | Miyai et al. | ................. 312/7.1 |
| 5,604,337 A * | 2/1997 | Sugimoto et al. | ........... 181/152 |
| 5,608,809 A * | 3/1997 | Ueda | ........................... 381/384 |
| 5,825,900 A | 10/1998 | Jeon | |
| 6,275,595 B1 * | 8/2001 | Lundgren et al. | ........... 381/306 |

OTHER PUBLICATIONS

Patent Abstracts of Japan, vol. 009, no. 173 (E-329), Jul. 18, 1985 & JP 60 043995—abstract.
Patent Abstracts of Japan, vol. 1996, no. 09, Sep. 30, 1996 & JP 08 116582—abstract.
Patent Abstracts of Japan, vol. 017, no. 575, Oct. 20, 1993, & JP 05 167951—abstract.
European Search Report dated May 14, 2002.

* cited by examiner

*Primary Examiner*—Suhan Ni
(74) *Attorney, Agent, or Firm*—Joseph J. Laks; Robert D. Shedd

(57) ABSTRACT

An electronic device comprises a first casing member, a second casing member and a loudspeaker unit adapted to be mounted to the second casing member. The two casing members are designed to be assembled by moving the first casing member towards the second casing member along a given trajectory into a fixing position and fixing it to the second casing member. The loudspeaker unit is held between the first and second casing members.

9 Claims, 4 Drawing Sheets

CASING FOR AN ELECTRONIC DEVICE AND PROCESS FOR ASSEMBLY OF SUCH A CASING

This application claims the benefit under 35 U.S.C. §365 of European patent application No. 01125111.3 filed Oct. 23, 2001.

FIELD OF THE INVENTION

The present invention relates to a casing for an electronic device, in particular for an electronic device that uses a loudspeaker, such as a display, a TV set, a radio etc. The invention also relates to a process of assembly of such a casing.

BACKGROUND OF THE INVENTION

When assembling such an electronic device, mounting a loudspeaker enclosure or loudspeakers is more problematic than the mounting of most other components, because the way the enclosure or loudspeaker is mounted has a critical influence on the quality of sound generated by the device. This quality is seriously impaired if the mounting of the enclosure or loudspeaker is not firm enough to prevent the frame of the enclosure or loudspeaker from trembling with respect to the support on which it is mounted, or if the support can be excited to vibrate by the sound produced by the loudspeaker. Conventionally, therefore, loudspeakers have been mounted by screwing to a support.

Furthermore, in a display having for instance a cathode ray tube, vibrations can generate disturbances on the displayed images if the enclosure or loudspeaker is not properly attached.

A TV set in which a loudspeaker is mounted without the use of screws is known from JP 600 43 995 A. According to this document, a loudspeaker can be mounted on a cabinet of a TV by engaging one side of the frame of the loudspeaker behind a pawl provided at an inner surface of a baffle board. A second pawl is connected to an edge of the baffle board by a film hinge. By folding the film hinge, this second pawl can be brought into engagement with the other side of the frame of the loudspeaker, and the pawl is held in position by mounting a rear cover to the cabinet.

With the cabinet design of this document, mounting a loudspeaker is already easier and faster than by the traditional method of screwing. However, mounting the rear cover behind the baffle board may be difficult. Namely, when the film hinge has been bent in order to engage the loudspeaker, care must be taken to prevent it from unbending again, because otherwise, the loudspeaker becomes loose again, and the rear cover cannot be mounted. A further problem is that the baffle board and the loudspeaker frame must be manufactured within narrow tolerance ranges. Namely, if the pawls are too close to each other, it may be impossible to fold the film hinge as far as necessary in order to enable the rear cover to be mounted, and if they are too far apart, the hold of the loudspeaker by the pawls may not be firm enough, so that the loudspeaker may rattle in operation.

SUMMARY OF THE INVENTION

It is the object of the present invention to provide a casing for an electronic device using a loudspeaker unit which is very easy to assemble.

This object is achieved by a casing for an electronic device comprising a first casing member, a second casing member, a loudspeaker unit comprising at least a loudspeaker and adapted to be mounted on the second casing member, the two casing members being designed to be assembled by moving the first casing member towards the second casing member along a given trajectory into a fixing position and fixing it to the second casing member, wherein the loudspeaker unit is held between the first and second casing members.

Here, by holding the loudspeaker unit between the first and second casing members, the second pawl of JP 600 43 994 A can be dispensed with, and the problem of keeping the hinge from unbending during the assembly of the casing vanishes.

Preferably, the loudspeaker unit and the first casing member have mating male and female first connecting members extending in a trajectory along which the two casing members are moved with respect to one another during assembly. Thus, the first connecting members automatically engage when the first casing member is brought into its fixing position, and assembling the first and second casing members is just as easy as if the loudspeaker unit were not there at all.

Considering the quality of sound, it is desirable that when the first connecting members are in the fixing position, there should be a space between them in which a first vibration absorbing member is located, in order to avoid transmission of vibrations from the loudspeaker unit to the casing.

Quite analogously, second male and female connecting members can be provided for mounting the loudspeaker unit to the second casing member.

If these second connecting members extend along the same trajectory as the first connecting members, the loudspeaker unit can be easily mounted to the second casing member by a movement with respect to the second casing member similar to the movement of the first casing member with respect to the second, and after the first casing member has been mounted, the loudspeaker unit will be firmly held between the two casing members.

Just like in the case of the first connecting members, there should be a space between the second male and female connecting members in said fixing position, and a second vibration absorbing member should be located in this space.

It is further preferred that the casing comprises one pair of first connecting members and two pairs of second connecting members. The two pairs of second connecting members give the loudspeaker unit a reasonably firm hold on the second casing member before the two casing members are assembled, so that when moving the first casing member towards the second into the fixing position, the one pair of first connecting members is easy to engage.

As a further means for facilitating assembly, resilient locking means can be provided which lock together the loudspeaker and the second casing member, so that there is no risk of these two elements coming apart while the first casing member is brought into the fixing position.

The invention also proposes a process for assembling a loudspeaker unit and a casing comprising a first casing member and a second casing member, comprising the step of moving the loudspeaker unit towards the second casing member thereby pre-mounting the loudspeaker unit to the second casing; realising electrical connections between the loudspeaker unit and electronic circuitry carried by the second casing; moving the first casing member towards the second casing member thereby assembling the loudspeaker unit to the casing.

BRIEF DESCRIPTION OF THE DRAWINGS

Further details and advantages of the invention will become apparent from the subsequent description of preferred embodiments given with reference to the drawings. In the drawings.

DETAILED DESCRIPTION OF PREFERED EMBODIMENTS

Figure 1:
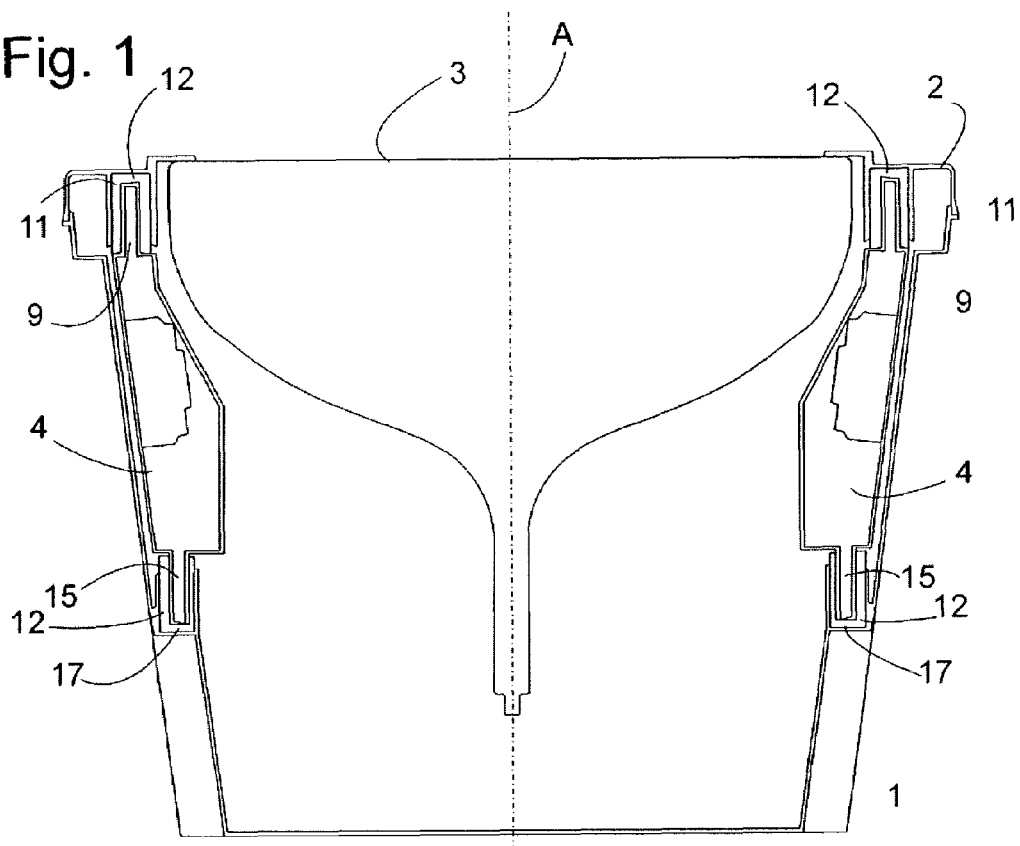
FIG. 1 is a schematic sectional drawing of a TV set according to the present invention.
Figure 2:
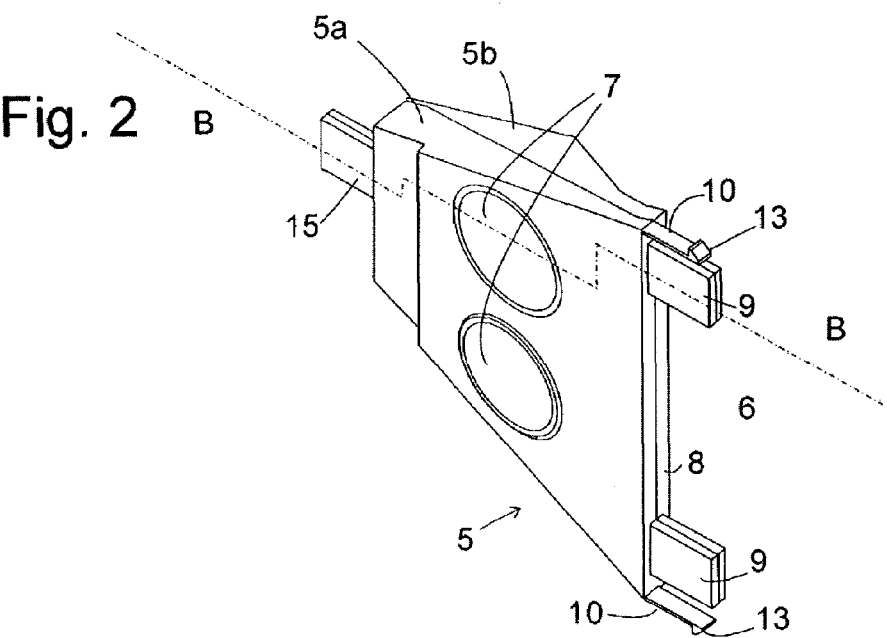
FIG. 2 is a perspective view of a loudspeaker unit of the TV set of FIG. 1.

FIG. 1 is a simplified horizontal section of a TV set according to the present invention, taken along dash-dot-line B of FIG. 2. The casing of the TV set is mainly formed of two members, a first casing member 1 forming the rear part of the casing and a second or front casing member 2 forming a frame which surrounds a visible front surface of a cathode ray tube (CRT)3.

The casing members 1, 2 are each moulded in one part from a plastics material.

The two casing members 1, 2 are designed to be assembled by moving them towards each other along an axis A of the cathode ray tube 3, into a fixing position as shown in FIG. 1, in which they are in contact with each other and are fixed one to the other e.g. by screws or by elastic latch elements (not shown) which are formed on one of the casing members 1 or 2 and engage openings of the other casing member 2 or 1, respectively.

The TV set has two loudspeaker units 4, here subwoofer loudspeaker enclosures, at the left hand and right hand sides of the CRT 3. Each of these loudspeaker units has a hollow shell 5, composed of shell halves 5a, 5b moulded from plastics material, which is shown in perspective in FIG. 2.

A side wall 6 of the shell has openings 7 for mounting individual loudspeakers (not shown) therein. FIG. 2 shows two such openings 7, but obviously, these openings 7 can be provided in any desirable number. A lateral surface 8, which after assembly faces the second casing member 2 is provided with two projections forming rigid male connecting elements 9 and two elastic latches 10. The elastic latches 10 realise pre-mounting means.

The second casing member 2 has female connecting members 11 designed for receiving the male connecting members 9. The receiving cavity of these female connecting members 11 is larger than the male connecting members 9, and the space between the two is filled with a vibration dampening material 12. There is no direct contact between the second casing member 2 and the loudspeaker units 4, so that vibrations of the shell 5 which may be excited by the operation of the loudspeakers cannot be transmitted to the second casing member 2 without being dampened by the dampening material 12. This greatly limits transmission of vibrations to the cathode ray tube.

The dampening material 12, e.g. a foamed plastics material, is performed in the shape of a cap, which can be stuck on the male connecting member 9 before engagement, so that the male connecting member 9, with the cap on it, can be pushed into a female connecting member 11 of the second casing member 2.

The second casing member 2 further has two openings (not shown) which are located so as to receive the tips of the latches 10 when the male connecting members 9 are introduced into the female connecting members 11. When the male members 9 are fully introduced, locking projections 13 of the latches 10 will engage with an edge of the opening, so that the second casing member 2 and the loudspeaker unit 4 cannot inadvertently come apart again. This intermediate stage of the mounting procedure is shown in FIG. 3 where the loudspeaker units are pre-mounted, or temporarily mounted, on the second casing member.

Since electronic circuitry 14 of the TV set is also mounted on the second casing member 2, electrical connections between the loudspeaker units 4 and the circuitry 14 can easily be installed at this stage.

Figure 3:
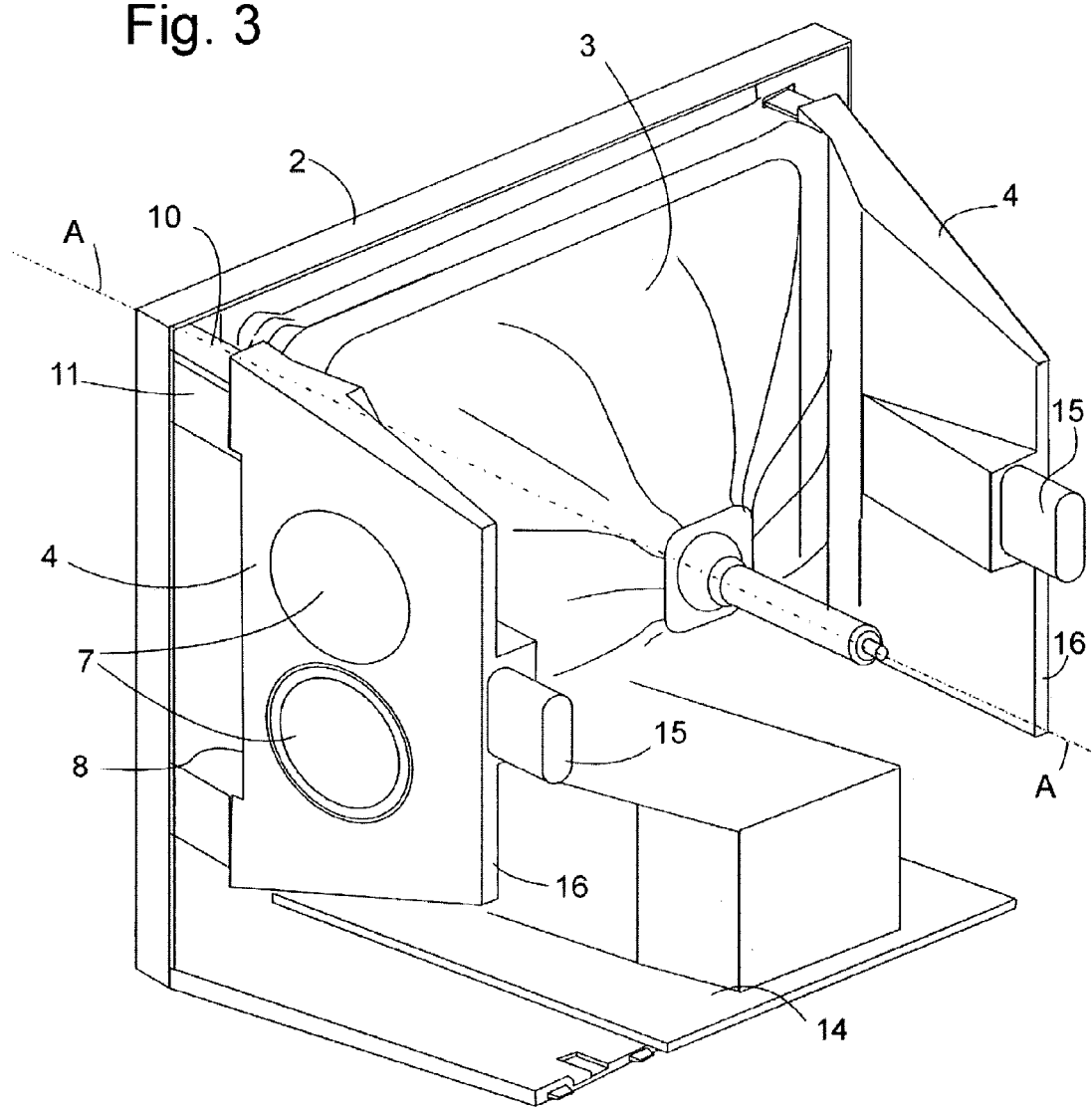
FIG. 3 is a perspective view of the TV set of FIG. 1 at an intermediate stage of the mounting procedure.

As can clearly be seen from FIG. 3, a further male connecting member 15 is provided at a side 16 of the loudspeaker unit 4 which is opposite to lateral side 8. Just like the male connecting members 9, this connecting member 15 extends along an axis parallel to axis A of the CRT 3.

In the last stage of the mounting procedure, rear casing member 1 is moved with respect to the second casing member 2, the CRT3 and the loudspeaker units 4 along axis A of the CRT 3 and is brought into contact with the second casing member 2. During this movement, male connecting members 15 are introduced into corresponding female connecting members 17 (see FIG. 1) of first casing member 1. The shape of male and female connecting members 15, 17 is the same as that of members 9, 13, so that here, too, a body of dampening material 12 can be fitted between the two types of connecting members 15, 17. In this way, when the first and second casing members 1, 2 are assembled, the loudspeaker units 4 are firmly held between the two at three points each, and at each of these points, there is a body of dampening material 12 between the loudspeaker unit 4 and any of the casing members 1, 2 which prevents unwanted vibration from being transmitted from the loudspeaker unit 4 to the casing members 1, 2.

Each loudspeaker unit 4 is thus mounted to the casing by mere relative movement between the loudspeaker unit 4, the second casing member 2 and the first casing member 1.

Figure 4:
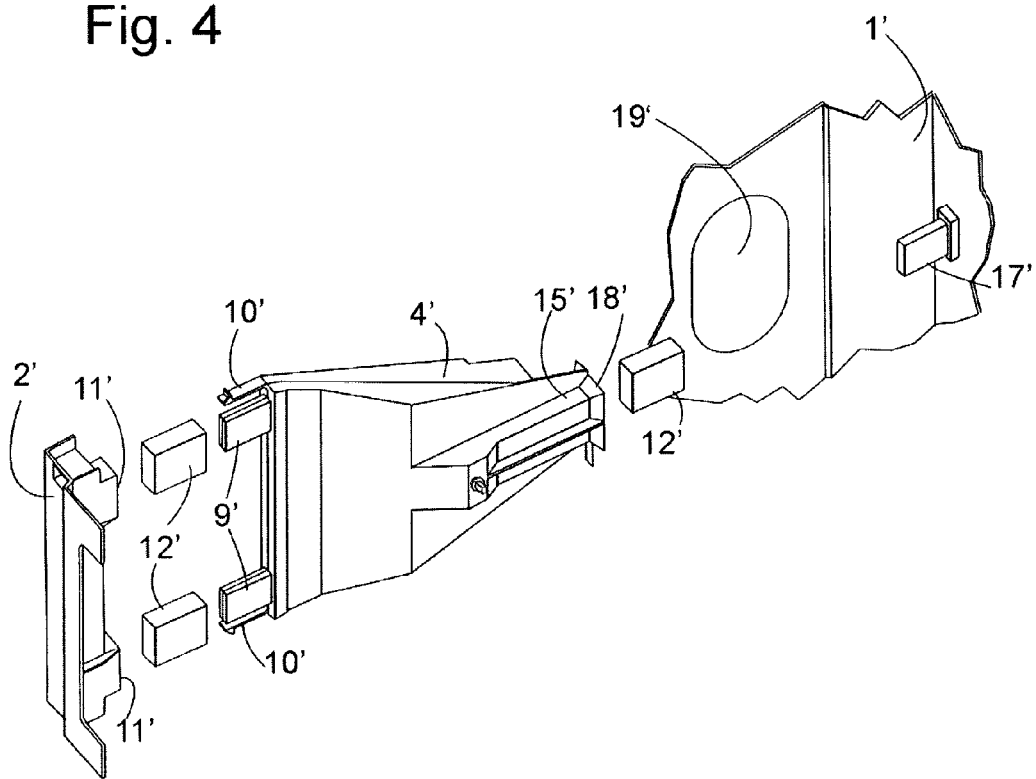
FIG. 4 is a drawn-apart view of a loudspeaker unit and parts of first and second casing elements according to a modified embodiment.

FIG. 4 is a drawn-apart perspective view of a modified embodiment of the present invention. Elements of this embodiment that are homologous to elements of the embodiment of FIGS. 1 to 3 have the same reference numerals and will be not described in detail again. For distinction, the reference numerals of this second embodiment have a prime (').

FIG. 4 shows parts of first and second casing members 1', 2' designed to co-operate with loudspeaker unit 4'. This embodiment differs from that of FIGS. 1 to 3 in that the loudspeaker unit 4' has no male but a female connecting member 15', which is designed to co-operate with a male connecting member 17' provided at the first casing member 1'. The male connecting member 17' can be integrally moulded with the first casing member 1' or a different part attached to the first casing member 1'.

The female connecting member 15' has a funnel-shaped opening portion 18'. This type of opening portion is useful in facilitating the introduction of the male connecting member 17' with the cap of dampening material 12' placed upon it, because when the first casing member 1' is being mounted, it conceals both connecting members 15', 17' from the view of an operator, so that the male connecting member 17' has to find its way "blindly" into the female one 15'.

Reference numeral 19' designates a grid in a side wall of rear casing member 1' which, when assembled, aligns with the locations of the loudspeakers of loudspeaker unit 4'.

Figure 5:
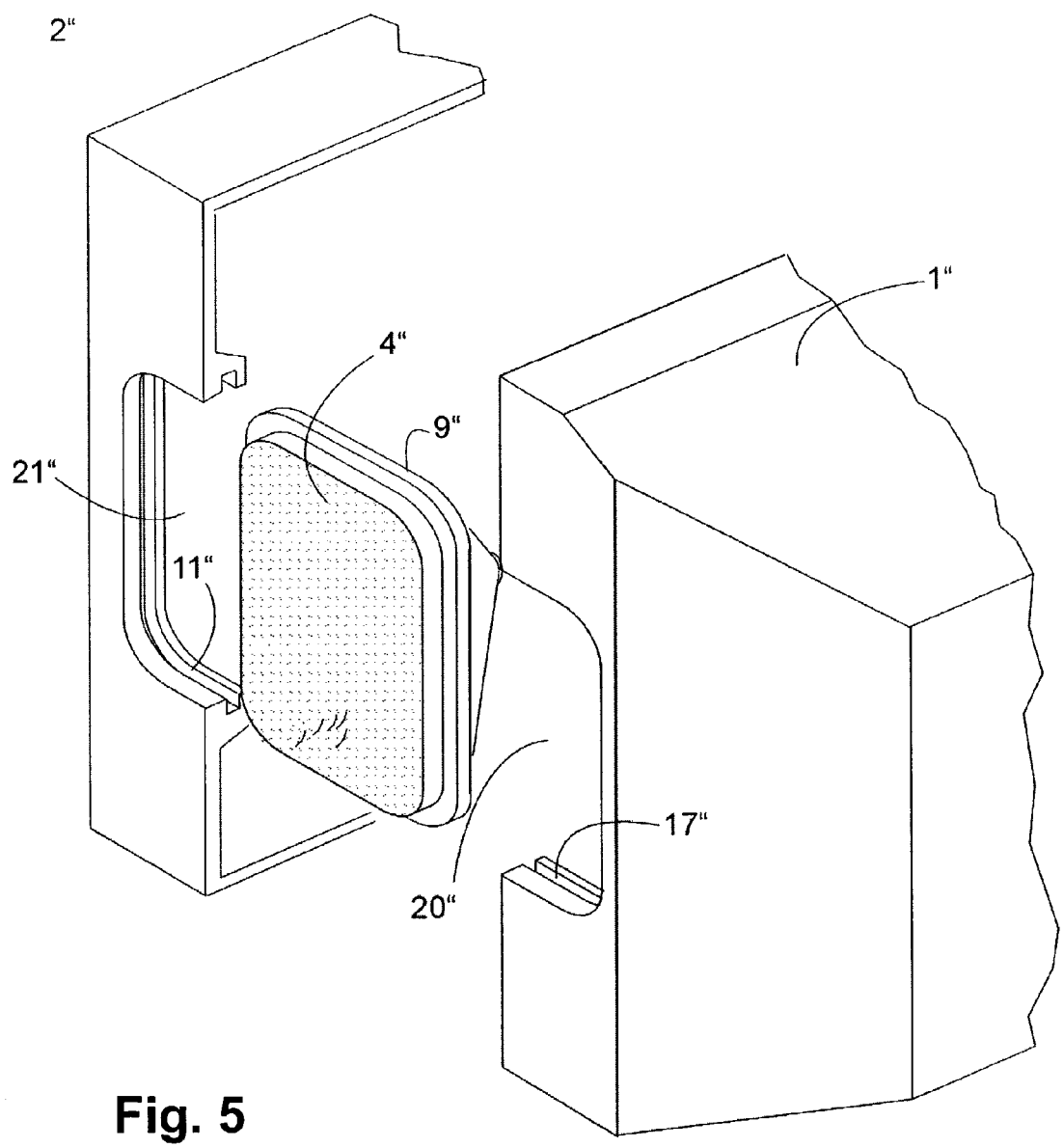
FIG. 5 is a drawn-apart perspective view of a loudspeaker unit and first and second casing members according to another embodiment of the invention.

FIG. 5 shows a third embodiment of the invention. Again, elements that correspond in function to elements of the first and second embodiments have the same reference numerals and are distinguished by two primes ("). Here, male and female connecting members are formed by a ridge 9" at the circumference of loudspeaker unit 4", and female connecting members are grooves 11", 17" at the edges of cut-outs 20", 21" of first and second casing members 1", 2", respectively.

Although not shown for this specific embodiment, latches analogous to the latches 10 of FIG. 2 might be provided at the loudspeaker unit 4" of this embodiment, too, in order to temporarily lock the loudspeaker unit 4" to the second casing member 2", so that there is no risk of these elements 2", 4" coming apart when the first casing member 1" is brought into its fixing position.

The loudspeaker unit 4" does not necessarily have a shell in which the loudspeaker itself is mounted. Instead, the circumferential ridge 9" might be the outer edge of a membrane-holding frame of the loudspeaker. Analogously, the embodiments of FIGS. 1 to 4 might be modified by not providing the shell 5 and placing the connecting member 9, 15 or 9', 15' directly on a membrane-holding frame.

It can be noted that, for each casing member, the connecting member(s) extend(s) along the direction of moulding of the casing member which simplifies the design for injection moulding. This direction is also the direction of assembly of the first and second casing member, and hence the direction of assembly of the loudspeaker unit.

Though the described embodiment comprises a cathode ray tube, the invention is not limited to this kind of display. For instance, the display can be a retro-projection system. Furthermore, the invention is not limited to use in a display but also applies to other types of casing for an electronic device.

What is claimed is:

1. A casing for an electronic device comprising a first casing member, a second casing member, a loudspeaker unit comprising at least a loudspeaker and adapted to be mounted on the second casing member, the first and the second casing members being designed to be assembled by moving the first casing member towards the second casing member along a given trajectory into a fixing position and fixing it to the second casing member, wherein the loudspeaker unit is held between the first and second casing members, and wherein the loudspeaker unit and the first casing members have mating male and female first connecting members extending along said trajectory so as to engage when the second casing member is brought into said fixing position.

2. A casing according to claim 1, wherein a space exists between said first male and female connecting members when in said fixing position, and that a first vibration absorbing member is located in said space.

3. A casing according to claim 1, wherein one of the first female connecting member has a funnel type receiving section.

4. A casing according to claim 1, wherein the loudspeaker unit is mounted to the second casing member by means of second male and female connecting members.

5. A casing according to claim 4, wherein the second connecting members extend along said trajectory.

6. A casing according to claim 4, wherein a space exists between said second male and female connecting members when in said fixing position, and that a second vibration absorbing member is located in said space.

7. A casing according to any of claim 4, wherein it comprises one pair of first connecting members and two pairs of second connecting members.

8. A casing according to claim 1, with pre-mounting means for locking at least temporarily together said loudspeaker unit and said second casing member.

9. A casing according to claim 1, wherein that the electronic device is a CRT device, in particular a TV set, wherein the second casing member is a casing front member forming a frame for a CRT, wherein the first casing member is a casing rear member, and wherein the loudspeaker unit is located at a lateral side of the casing.

* * * * *